United States Patent
Doering et al.

(10) Patent No.: US 7,478,391 B2
(45) Date of Patent: Jan. 13, 2009

(54) DETERMINING A PRIORITY VALUE FOR A THREAD FOR EXECUTION ON A MULTITHREADING PROCESSOR SYSTEM

(75) Inventors: Andreas Doering, Adliswil (CH); Maria Gabrani, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 10/737,464

(22) Filed: Dec. 16, 2003

(65) Prior Publication Data

US 2004/0154018 A1    Aug. 5, 2004

(30) Foreign Application Priority Data

Dec. 20, 2002   (EP)   .................... 02028545

(51) Int. Cl.
*G06F 9/46*   (2006.01)
(52) U.S. Cl. .................................... 718/100
(58) Field of Classification Search .......... 718/100
See application file for complete search history.

(56) References Cited

U.S. PATENT DOCUMENTS 5,752,031 A * 5/1998 Cutler et al. ............... 718/103

2002/0087523 A1 * 7/2002 Eatough ...................... 709/203

OTHER PUBLICATIONS

Luo, Kun et al. "Boosting SMT Performance by Speculation Control."
Dorai, Gautham et al. "Optimizing SMT Processors for High Single-Thread Performance," Journal of Instruction-Level Parallelism 5, published Apr. 2003, 1-35.
Tullsen, Dean et al. "Exploiting Choice: Instruction Fetch and Issue on An Implementable Simultaneous Multithreading Processor," Proceedings of the 23rd Annual International Symposium Computer Architecture, Philadelphia, PA May 1996.

* cited by examiner

*Primary Examiner*—Meng-Ai An
*Assistant Examiner*—Mengyao Zhe
(74) *Attorney, Agent, or Firm*—Stephen C. Kaufman

(57) ABSTRACT

The invention describes methods, systems and an apparatus for determining a priority value for a thread for execution on a multithreading processor system. The priority value is determined subject to a priority base rating and an application priority rating. The priority base rating represents a priority rating of the thread with regard to other threads. The application priority rating represents a priority rating of the thread from the thread's application point of view.

14 Claims, 2 Drawing Sheets

DETERMINING A PRIORITY VALUE FOR A THREAD FOR EXECUTION ON A MULTITHREADING PROCESSOR SYSTEM

TECHNICAL FIELD

The present invention relates to a method and an apparatus for determining a priority value for a thread for execution on a multithreading processor system.

BACKGROUND OF THE INVENTION

In a processor or processor core with hardware multithreading support (MTP=Multithreading Processor), several threads can be executed concurrently. In the following, the term thread is used as synonym for what is also called a routine, a set of instructions, a task or a process according to technical language. Due to cache misses, coprocessor use or synchronization mechanisms some of the threads may have to wait for a limited amount of time. In this time instructions from these threads can not be executed. Typically the remaining threads compete for the processing resources/execution pipelines such as arithmetic-logic-units or memory interfaces. Threads can be executed in parallel in different execution pipes and competition is for one or more of these execution pipes. This competition has to be resolved by selecting one or more threads whose instructions will be executed next.

If no control of the way instructions are issued exists in such processors, a single thread can be executed slower than it would be executed on a single thread processor system. Recently, MTP have been used for systems with real-time constraints as well, e.g. network and media processors. In these fields the execution time requirements of threads may vary depending on several issues. Therefore it is important to guarantee thread execution differentiation. To that end, a mechanism that controls the way instructions are issued from threads is of high value.

The current methodologies investigated and discussed in the literature mainly concentrate on improving the overall throughput of a multithreaded processor.

U.S. Pat. No. 6,105,127 discloses a multithreaded processor for executing multithreaded instructions stream. A control unit is provided for deciding which instruction should be issued to a functional unit designated by two or more instruction issues requests at the same time, in accordance with priority levels held by a holding unit.

U.S. Pat. No. 6,212,544 B1 discloses a method for controlling the switching between at least two threads. Priorities are incorporated by a thread state register comprising a thread priority field for one of three priority values—low, medium, high.

U.S. Pat. No. 6,477,562 B2 introduces instruction scheduling for multi-streaming processors. A priority controller generates priorities for instruction selection and access rights to certain resources.

In many systems, tasks of varying importance are assigned to the threads of a processor. In such a situation, the instruction selection process has to be controlled to guarantee that the most important tasks are executed first and thus, fast. At the same time, the effort of the control of instruction selection should be very low, because it impacts—and in particular reduces—the total amount of processing capacities for applications.

Thus, it is desired to provide a method and an apparatus for determining a priority value for a thread for execution on a multithreading processor system, that defines the priority value of a thread in a way that takes the true need of execution at the time into account.

SUMMARY OF THE INVENTION

Thus, the present invention provides methods and apparatus for determining a priority value for a thread for execution on a multithreading processor system, that defines the priority value of a thread in a way that takes the true need of execution at the time into account. It is another aspect of the invention to perform the determination of the priority value at minimal cost and at high speed.

In an example embodiment, there is provided a method of determining a priority value for a thread for execution on a multithreading processor system, the method comprising receiving a priority base rating, receiving an application priority rating from a thread's application, and determining the priority value subject to the base rating and the application priority rating.

According to another aspect of the invention, there is provided an apparatus for determining a priority value for each thread for execution on a multithreading system. This apparatus comprises a base value register for depositing a priority base value delivered from the multithreading processor system, and an evaluation unit for determining the priority value subject to the priority base value and an application priority value delivered from a thread's application.

According to another aspect of the invention, there is provided a computer program element comprising computer program code which, when loaded in a processor unit of an apparatus, configures the processor unit for performing a method as described above or any one of the method's embodiments.

BRIEF DESCRIPTION OF THE DRAWINGS

The invention and its embodiments will be more fully appreciated by reference to the following detailed description of presently advantageous but nonetheless illustrative embodiments in accordance with the present invention when taken in conjunction with the accompanying drawings., in which.

Figure 1:
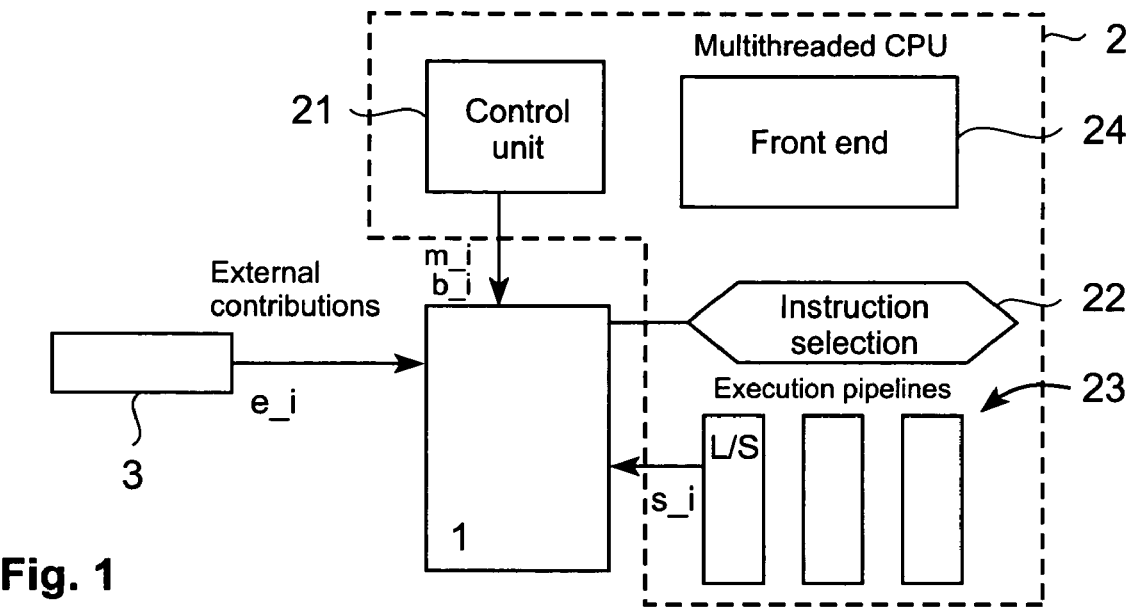
FIG. 1 a block diagram of an apparatus according to an embodiment of the present invention and an associated multithreading processor system, FIG. 2 a schematic diagram of an apparatus, in accordance with an embodiment of the present invention, FIG. 3 a schematic diagram of another apparatus, in accordance with an embodiment of the present invention, and FIG. 4 an alternative register structure used in an apparatus, in accordance with an embodiment of the present invention.

Different figures may contain identical references, representing elements with similar or uniform content.

DETAILED DESCRIPTION OF THE INVENTION

The present invention provides methods, apparatus and systems for determining a priority value for a thread for execution on a multithreading processor system. A method comprises receiving a priority base rating, receiving an application priority rating from a thread's application, and determining the priority value subject to the base rating and the application priority rating.

The thread to be assessed can be a thread that is in a queue of threads waiting to be executed on the multithreading processor system, or be a thread that already started to be executed but may be reassessed, and may finally be re-ranked according to changes in priority values of other waiting threads or even running threads, and thus be reset into the queue of waiting threads or be continued in execution.

A justified priority level for a thread is subject to a priority assessment of the thread from the thread's application itself, which has unique knowledge of the individual requirements of a single thread. Such application priority rating can be delivered from the thread's associated application or might be sort of attached to the thread itself. An additional source of priority rating information is advantageously the multithreading processor system, which has unique knowledge of the different relative requirements of all threads in the system. Multithreading processor control unit, e.g. its operating system or some other control logic are advantageous sources of the multithreading processor system for delivering the priority base value to the inventive apparatus or as input of the inventive method. However, another processor system might be capable of rating the threads of the multithreading processor system in a relative manner.

The priority value, which in the end allows a ranking of the thread amongst other threads with other priority values associated and determines in particular access time and resources for the thread, is based on the priority base value and the application priority value. This means, that at least these two ratings have impact on the priority value in some way.

The invention shows lots of benefits: The thread prioritization method and apparatus consider input ratings from different sources that influence a thread's priority in a distinct and unique way. These ratings are taken from the input source's point of view. Sources are select such that they take different view based on different information the sources have access to. The input values of these sources are structured in a way that differentiation between threads can be obtained in a relative way, which simplifies the decision and input update process a lot. The priorities used for instruction selection can be modified from the several sources with minimal software or hardware effort.

The application code is independent of its overall priority and the hardware context on which it is executed. This reduces program code size and number of instructions. The proposed invention can be used with a wide number of hardware threads and a wide range of resolution of the contributions to thread priority. The impact of the various sources on each thread's priority can be controlled by a control unit (e.g. operating system) without invocation of the control program at every modification of a source's contribution. Advantageously, the priority base rating represents a priority rating of the thread with regard to other threads. Base priority values of other threads typically have impact on determining a base priority value of a certain thread. The multithreading processor system assesses the base priority value of a thread in relation to the base priority values of other threads. advantageously, application priority rating represents a priority rating of the thread from the thread's application point of view. Application for example might know that the thread to be rated is actually an important part of the overall application or a part that has to be handled very quickly in relation to other parts of the application, that are represented by other threads. In such a case, the application will attribute a high application priority level to this thread.

Priority base rating is typically represented by a priority base value and the application priority rating is typically represented by an application priority value. Such values are typically stored in respective registers when brought to the apparatus' attention.

According to an advantageous embodiment of the present invention, a main value is obtained by adding the priority base value and the application priority value. In one embodiment, this main value can be used as priority value. In another embodiment, this main value is used as interim value the priority value is based on. The main value is reflecting the processor's and the application's priority rating of the thread.

In another advantageous embodiment of the invention, a priority maximum value is introduced, wherein the priority maximum value and the priority base value define a set of initial boundaries for the priority value. The priority maximum value can be delivered from the multithreading processor system, thus defining a maximum value the priority value based on the priority base value and the application priority value typically should not exceed. The priority maximum value might also be calculated by the apparatus subject to the priority base value. Then, only the priority base value has to be transferred from the multithreading processor system. The priority maximum value can vary for different threads. Also, the range that is defined by the priority maximum value and the priority base value and having the priority maximum value and the priority base value as boundaries can have different extension from thread to thread.

Advantageously, a first lower value is determined as lower value of the main value and the maximum value. This is to limit priority values to the given priority maximum value, even when the sum of priority base value and application priority value exceeds the priority maximum value. Introduction of the priority maximum value is used to assure that a thread will not completely limit processing capacity and thus make other waiting threads starve. In an embodiment, the first lower value can also be used as priority value for the thread considered.

In another advantageous embodiment of the invention, an external priority rating of the thread is received, and the priority value is determined subject to the external priority rating. External input might be worth considered. External contributions represent another independent source of priority rating since taking a different view and based on different deliberations than the application or the multithreading processor system. The input is not limited to a specific external request but can be extended to several external contributions.

Advantageously, the external priority rating represents a priority rating of the thread considering external needs, and the external priority rating is represented by an external priority value.

In another advantageous embodiment, an external limit value is defined and a second lower value is determined that is the lower value of the external priority value and the external limit value. In this embodiment, the external limit value is used to assure that a thread and in particular its external priority rating will not completely limit processing capacity for other threads and thus make other waiting threads starve. The external limit value is advantageously set by the apparatus itself, or can be transmitted by the multithreading processor system.

Advantageously, the priority value is obtained as a function of the first lower value and the second lower value. For example, these values might be added or subject o a maximum function. When determining the priority value this way, the priority value is a priori limited to a range of values between the priority base value and the priority maximum value plus the external limit value. The upper boundary is extended with regard to an embodiment where only application and processor system rating were considered. Additional external rating might be worth permitting a higher upper boundary of a range for priority values.

In another advantageous embodiment of the present invention, the priority value is determined anew when at least one of the values involved in the specific calculation of the priority value has changed. This makes the method and the apparatus responsive to changes and adapt priority levels accordingly.

Advantageously, a priority value is determined for each thread, and the threads are ranked according to their respective priority value. Priority values of different threads are still numeric values. In order to translate these values into a ranking, advantageously a sorter is used. Then, the multithreading processing system can process the threads according to the ranking.

According to another aspect of the invention, there is provided an apparatus for determining a priority value for each thread for execution on a multithreading system. This apparatus comprises a base value register for depositing a priority base value delivered from the multithreading processor system, and an evaluation unit for determining the priority value subject to the priority base value and an application priority value delivered from a thread's application.

The evaluation unit can be implemented in hardware or software or a combination thereof, or any other suitable implementation, although an implementation in hardware is advantageous due to limited costs, quick responsiveness and speed, in particular when used in the field of network processing.

Advantages of the inventive apparatus and its embodiments go along with the advantages of the inventive method and its embodiments described above.

According to another aspect of the invention, there is provided a computer program element comprising computer program code which, when loaded in a processor unit of an apparatus, configures the processor unit for performing a method as described above or any one of the method's embodiments.

FIG. 1 shows a block diagram of an apparatus 1 and an associated multithreading processor system 2.

The proposed apparatus 1 communicates with the multithreading processor system 2—that comprises at least a control unit 21 and software—by providing thread ranks r to an instruction selection element 22 of the multithreading processor system 2, and by receiving values from the control unit 21, from an execution pipeline 23 from external sources 3. The external sources 3 provide an external priority value e_i to the apparatus 1, while the control unit 21 provides a priority base value b_i and a maximum priority value m_i to the apparatus 1. An application priority rating s_i is provided by execution pipelines 23 that communicates the priority rating s_i of a thread's application to the apparatus 1 by load/store commands LS. The transfer of values b_i and m_i from the control unit 21 to the apparatus 1 can be accomplished with registers in the apparatus 1. The multithreading processor system 2 communicates with the apparatus 1 by using existing instructions like "load" and "store" or "access" to dedicated registers. For instance, if the shown multithreading processor system 2 is a PowerPC type processor, special function registers or device control registers can be used which are accessed via dedicated instructions. Otherwise, the communication can be done by mapping the control registers into memory. Note, that the control unit can be an external entity or a software process on the processor.

Apparatus 1 can be incorporated into the multithreading processor system 2 or form an integral part of, or can be part of the processor core or be separately implemented and coupled through interfaces, e.g. the ones discussed above.

The right half of multithreading processor system 2 in FIG. 1 symbolizes processing of a thread. Starting with a front part 24 of execution, instruction selection unit 22 then provides respective information, and execution pipelines 23 perform execution.

In this embodiment, three separate sources are considered that transfer independent priority ratings on a thread to the apparatus, the three priority ratings influence a priority value—also called physical priority—that is allocated to the thread by means of the apparatus. The three sources are:

The application itself, which has unique knowledge of the individual requirements of a single thread.

A processor control unit, for example as part of an operating system, which has unique knowledge of the different relative requirements of all threads in the system.

External input, which has unique knowledge of the status of external requests. The external input can be widened for several external contributions.

Assume that the normal execution of a thread uses a medium application priority value S_i from the view of the thread. At some situations the thread may know that the following execution is of lower application priority value s_i. An example for this is, when the thread requests an external resource it will need at a later point and has some work to do up to this point. In this situation it may be favorable to run the thread with a lower application priority value s_i, and therefore normally with a lower instruction rate instead of running first with normal application priority value s_i and waiting later for the requested item. In contrast to this, when the thread has occupied a critical resource, e.g. a semaphore of a frequently used data object, it can increase its priority to a higher application priority value a_i to reduce the pressure on this resource.

To allow all threads to execute the same code and reduce the overhead of the priority modification, a uniform way of accessing the thread's priority contribution is desirable. This is accomplished via the use of dedicated registers which are accessed via existing instructions, e.g. special function registers (SFR) or device control registers (DCR) in a PowerPC processor. The idea is that all threads use the same register number and the hardware incorporates the identity of the thread which executed the instruction later.

However, a thread usually does not know which other threads run on the same processor. Therefore, there may be threads with tasks of way higher or lower importance. To take this into account, a control unit which controls the threads on the multithreading processors sets a priority base value b_i and a maximum priority value m_i for each thread. The maximum priority values m_i can be used to assure that a thread will not starve other threads. The priority base values b_i assist in keeping a balance in the relative thread priorities as assigned by the control unit of the multithreading processor system.

Figure 2:
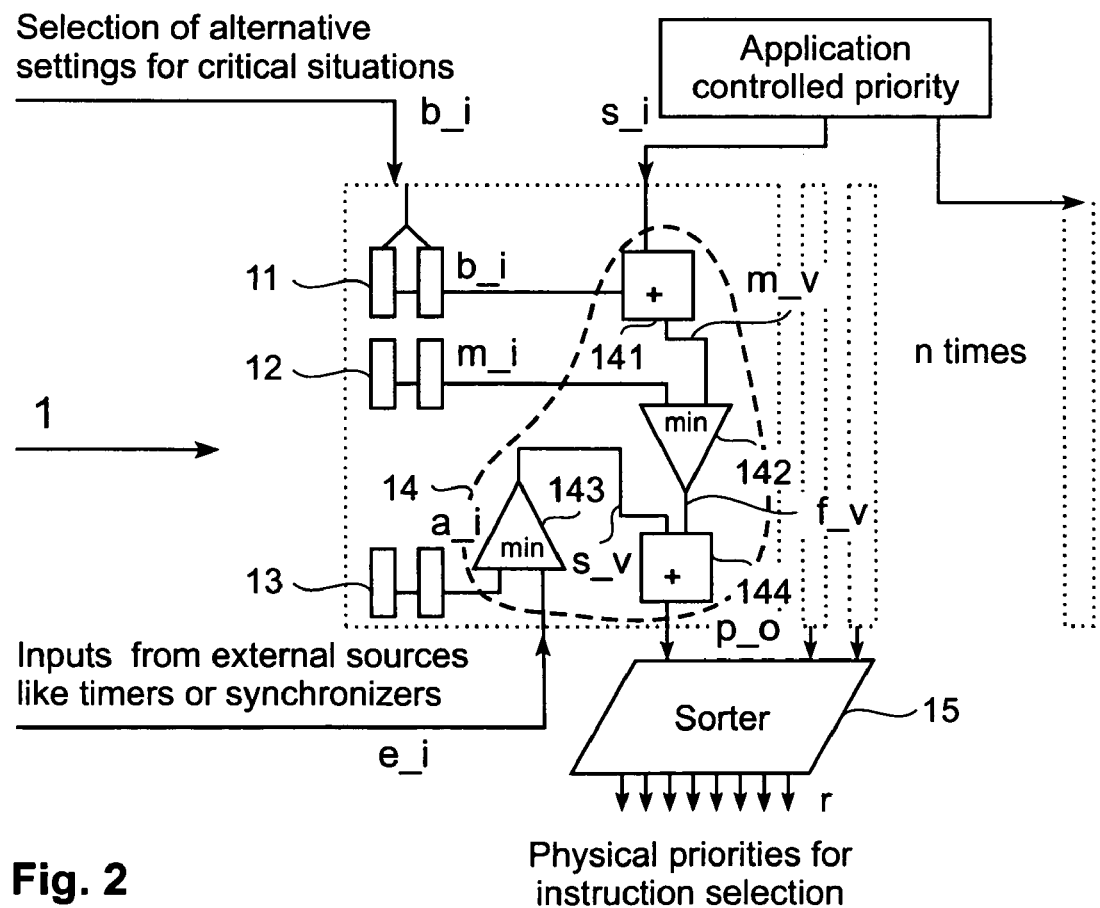

FIG. 2 shows a schematic diagram of an apparatus 1 that is supplied with such priority base value b_i, such maximum priority value m_i, and such application priority value s_i. Priority base value b_i is stored in base value register 11, maximum priority value m_i is stored in maximum value register 12. Application priority value s_i might also be stored in a register not shown in FIG. 2.

Apparatus 1 further comprises an evaluation unit 14 including an adder 141 and a minimum function 142. Priority base value b_i and application priority value s_i are added to a main value m_v, which can—in some other embodiments—also be taken as priority value for the thread. In contrast it is advantageous here, that the main value is further processed.

Output of minimum function 142 delivers a first minimum value f_v that is f_v=min(m_i, b_i+s_i).

A third contribution is considered before the physical priority is determined, even though in some embodiments the first minimum value could be taken as physical priority. This third priority assessment comes from external sources. One example for an external source is a synchronization coprocessor. When it detects that another thread requests a semaphore which is occupied by the considered thread it may boost the priority temporarily over the normal bound m_i. Again, a limiting factor may be introduced. This limiting factor is external limit value a_i which is stored in external limit value register 13.

If the value delivered from the external source is e_i—which may also be stored in an associated register not shown in FIG. 2, the contribution to the overall priority value is determined by a minimum function 143 which provides a second minimum value s_v=min(a_i, e_i) at its output. Second minimum value s_v is then added by means of adder 144 to first minimum value f_v. Result is priority value p_o. Note that the maximum priority value p_o a thread can reach this way is m_i+a_i. If several external sources are used, their values can be combined by either adding them or by using their maximum.

Note that FIG. 2 shows registers 11 to 13 and evaluation unit 14 only for calculating a priority value for one single thread. With n threads to be evaluated, these elements have to be provided n times, as indicated by dotted lines in FIG. 2.

It may be desirable, to allow in this process a larger range of values from the sources than the value range the physical priorities have. Therefore, a sorting step may be needed to generate the final values for the physical priorities. A sorter 15 may generate a ranking out of priority values p_o. Sorter output is ranking r of priority values. The sorter 15 can work incrementally, i.e. it rearranges its output r every time one of the inputs changes. In this way, the area cost of the sorter 15 is reduced.

As indicated above, the structure including the adders and two "min" circuits is advantageously repeated for every hardware context in the processor. All components above the sorter 15 like adder, min functions and registers can work on bit vectors of a common width w which determines precision. An appropriate value for the precision depends on the intended applications and the number of threads. A range of eight to sixteen is an advantageous number of threads to handle. The sorter 15 retains the relative sizes of the inputs but generates output bit vectors of minimal size. As an example, for eight threads a three-bit vector representing each thread's priority value is sufficient.

Figure 3:
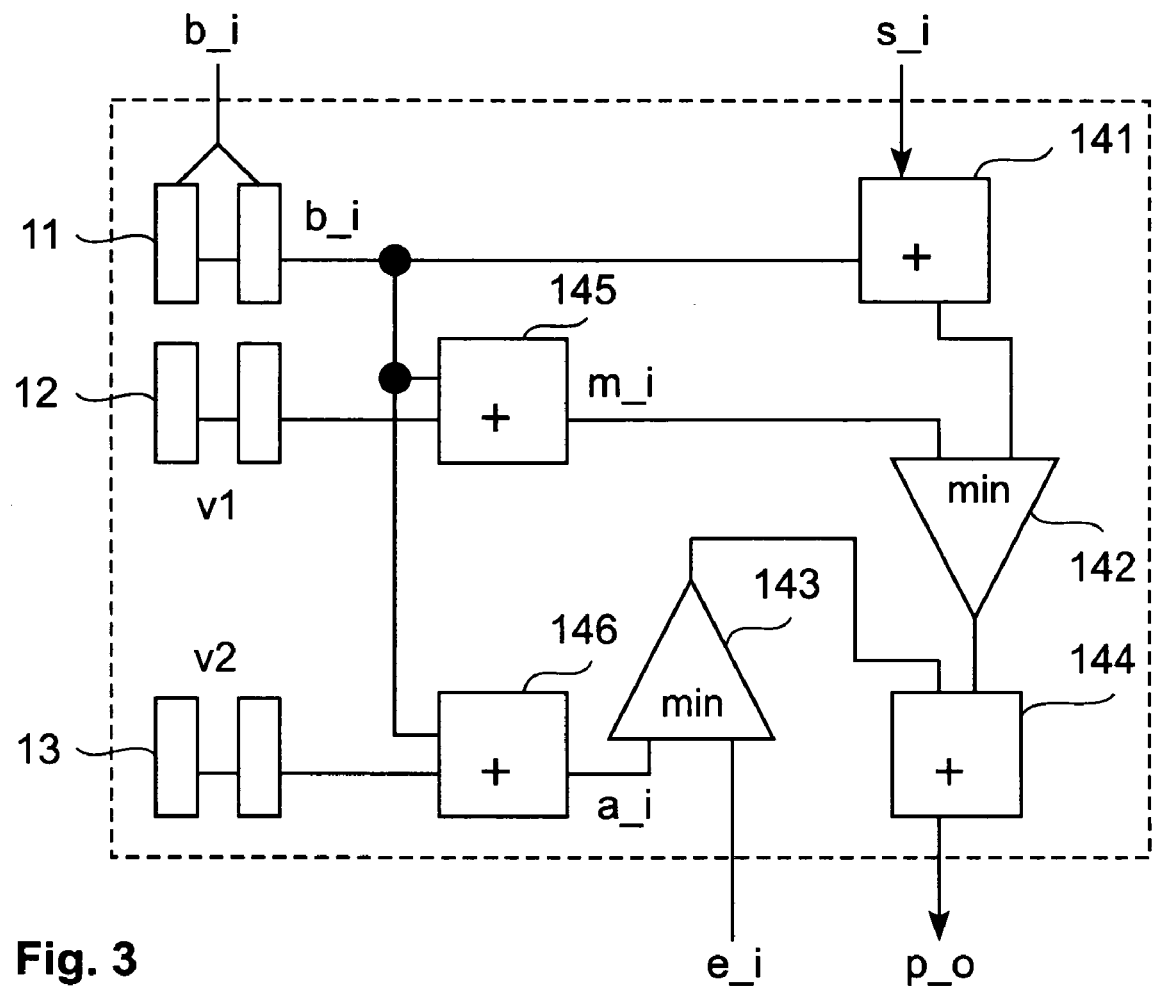

FIG. 3 shows a schematic diagram of another apparatus, in accordance with an embodiment of the present invention. This embodiment creates the maximum priority values m_i as offsets from the base priority values b_i. That means that the writing of a priority base value b_i into the base value register 11 and writing an offset value v1 into the maximum value register 12 results in a priority maximum value of m_i=b_i+v1 by means of adder 145. The same applies for a_i: Another offset value v2 is written in the external limit value register 13 and added to the priority base value b_i by means of adder 146, resulting in external limit value a_i. Such a behavior can be obtained by inserting an adder before each of the min blocks.

In FIGS. 2 and 3 all the registers 11, 12, 13 are drawn twice. This illustrates a proposed feature of the apparatus of containing several sets of registers which can be switched very fast. In this way, in emergency situations an appropriate configuration can be established very quickly and the previous configuration used for normal operation is conserved and can be reactivated after the error situation is resolved. Error handling is improved. In a network processor, there is frequently a control point which supervises a lot of other processors. An example scenario is that the control point processor switches between the normal operation and the exceptional operation register set for some or all processors.

Figure 4:
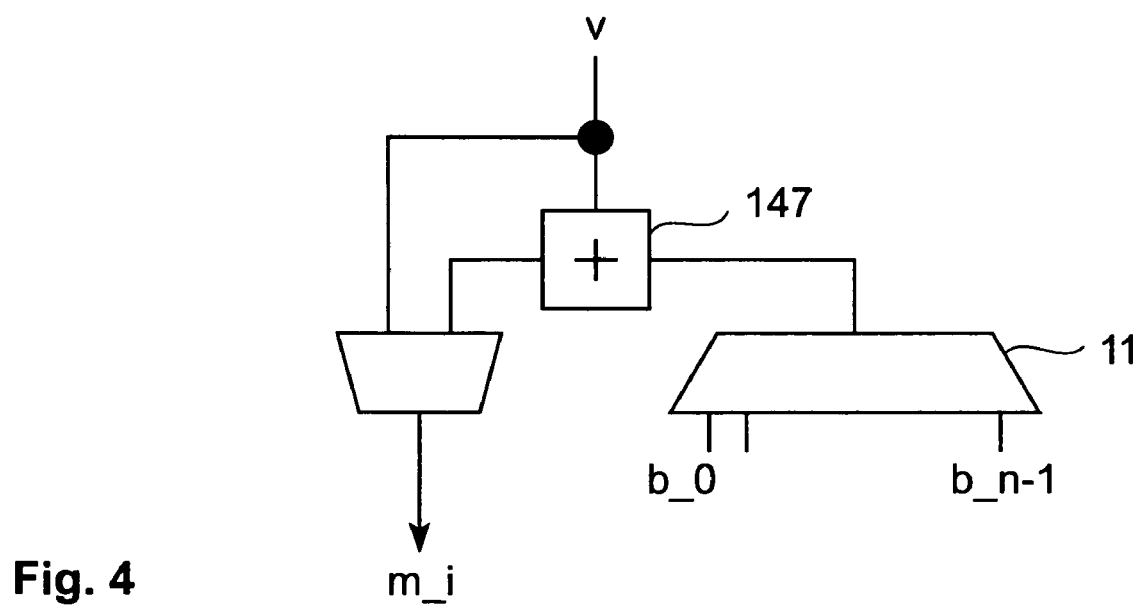

However, a cheaper solution is expected if one common conditional adder 147 is used in the write and read paths to the registers. The write path is shown in the following FIG. 4, supplying offset value v.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method of determining a priority value for a thread for execution on a multithreading processor system, comprising:
   receiving a priority base rating from the multithreading processor system, wherein:
      the priority base rating represents a priority rating of the thread with regard to other threads;
      the priority base rating is represented by a priority base value and an application priority rating is represented by an application priority value;
      the priority value is limited to a defined range;
      the priority base value defines a lower boundary of the range; and
   receiving an application priority rating from a thread's application delivered from one of a thread's associated application or attached to the thread itself, wherein the application priority rating represents a priority rating of the thread from a thread's application decision making system that gives the thread a priority rating relative to other threads in said thread's application, when a priority maximum value defines an upper boundary of the range, said priority maximum value being delivered from the multithreading processor system or calculated subject to the priority base value;
   receiving a main value by adding the priority base value and the application priority value, said main value being used as said priority value or as interim value the priority value is based on;
   determining a first lower value that is the lower value of the main value and the maximum value, the first lower value being made equal to a smallest number between the main and maximum value; and
   employing said main value and said first lower value in determining the priority value for execution on the multithreading processor system subject to the priority base rating and the application priority rating.

2. A method according to claim 1,
   further comprising:
   receiving an external priority rating of the thread, and
      determining the priority value subject to the external priority rating, and
   when the external priority rating represents a priority rating of the thread considering external needs, and wherein the external priority rating is represented by an external priority value, and
   further comprising:
      defining an external limit value;
      determining a second lower value that is the lower value of the external priority value and the external limit value;
      receiving the priority value as a function of the first lower value and the second lower value, and
   wherein the priority value is redetermined when at least one value involved in a specific calculation of the priority value has changed; and
      when a priority value is determined for each thread, the threads are ranked according to their respective priority value.

3. A method according to claim 1,
wherein the priority base rating is represented by a priority base value and the application priority rating is represented by an application priority value.

4. A method according to claim 1
wherein the priority value is limited to a defined range.

5. A method according to claim 4,
wherein the priority base value defines the lower boundary of the range.

6. A method according to claim 4, comprising
wherein a priority maximum value defines an upper boundary of the range, said priority maximum value being delivered from the multithreading processor system or calculated subject to the priority base value.

7. A method according to claim 3, comprising
receiving a main value by adding the priority base value and the application priority value, said main value being used as said priority value or as interim value the priority value is based on.

8. A method according to claim 7, comprising
determining a first lower value that is the lower value of the main value and the maximum value, the first lower value is made equal to whichever number that is the smallest between the main and maximum value.

9. A method according to claim 8, comprising
receiving an external priority rating of the thread, and
determining the priority value subject to the external priority rating.

10. A method according to claim 9,
wherein the external priority rating represents a priority rating of the thread considering external needs, and
wherein the external priority rating is represented by an external priority value.

11. A method according to claim 10, comprising
defining an external limit value,
determining a second lower value that is the lower value of the external priority value and the external limit value.

12. A method according to claim 11, comprising
receiving the priority value as a function of the first lower value and the second lower value.

13. A method according to claim 1,
wherein the priority value is determined when at least one of the values involved in the specific calculation of the priority value has changed.

14. A method according to claim 1,
wherein a priority value is determined for each thread, and
wherein the threads are ranked according to their respective priority value.

* * * * *